(12) United States Patent
Burges et al.

(10) Patent No.: US 7,788,254 B2
(45) Date of Patent: Aug. 31, 2010

(54) WEB PAGE ANALYSIS USING MULTIPLE GRAPHS

(75) Inventors: Christopher J. C. Burges, Bellevue, WA (US); Dengyong Zhou, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 342 days.

(21) Appl. No.: 11/901,049

(22) Filed: Sep. 14, 2007

(65) Prior Publication Data

US 2008/0275902 A1 Nov. 6, 2008

Related U.S. Application Data

(60) Provisional application No. 60/927,648, filed on May 4, 2007.

(51) Int. Cl.
G06F 7/00 (2006.01)
G06F 17/30 (2006.01)

(52) U.S. Cl. .................. 707/710; 707/798; 707/803; 707/805

(58) Field of Classification Search .............. 707/102, 707/710
See application file for complete search history.

(56) References Cited

U.S. PATENT DOCUMENTS

| | | | |
|---|---|---|---|
| 5,895,470 A | 4/1999 | Pirolli et al. ............. 707/102 |
| 6,144,962 A | 11/2000 | Weinberg et al. | |
| 6,389,436 B1 | 5/2002 | Chakrabarti et al. ....... 707/513 |
| 6,684,205 B1 | 1/2004 | Modha et al. | |
| 6,938,053 B2 | 8/2005 | Jaro ......................... 704/104.1 |
| 7,181,678 B2 | 2/2007 | Chundi ....................... 715/500 |
| 7,617,194 B2 * | 11/2009 | Liu et al. ......................... 1/1 |
| 2005/0044478 A1 * | 2/2005 | Ali et al. .................. 715/500.1 |
| 2006/0004748 A1 | 1/2006 | Ramarathnam et al. ......... 707/6 |
| 2006/0026191 A1 * | 2/2006 | McSherry ..................... 707/102 |
| 2006/0069667 A1 | 3/2006 | Manasse et al. | |
| 2006/0095416 A1 | 5/2006 | Barkhin et al. ................. 707/3 |
| 2006/0122957 A1 | 6/2006 | Chen ............................. 707/1 |

(Continued)

OTHER PUBLICATIONS

Pavel Calado et al., "Combining Link-Based and Content-Based Methods for Web Document Classification". CIKM'03, November 308 2003, New Orleans, LA pp. 394-401.

(Continued)

*Primary Examiner*—Kuen S Lu
*Assistant Examiner*—Binh V Ho
(74) *Attorney, Agent, or Firm*—Joseph R. Kelly; Westman, Champlin & Kelly, P.A.

(57) ABSTRACT

A collection of web pages is modeled as a directed graph, in which the nodes of the graph are the web pages and directed edges are hyperlinks. Web pages can also be represented by content, or by other features, to obtain a similarity graph over the web pages, where nodes again denote the web pages and the links or edges between each pair of nodes is weighted by a corresponding similarity between those two nodes. A random walk is defined for each graph, and a mixture of the random walks is obtained for the set of graphs. The collection of web pages is then analyzed based on the mixture to obtain a web page analysis result. The web page analysis result can be, for example, clustering of the web pages to discover web communities, classifying or categorizing the web pages, or spam detection indicating whether a given web page is spam or content.

20 Claims, 5 Drawing Sheets

U.S. PATENT DOCUMENTS

| | | | |
|---|---|---|---|
| 2006/0149710 A1 | 7/2006 | Koningstein et al. | 707/3 |
| 2006/0195439 A1 | 8/2006 | Selberg | 707/5 |
| 2006/0294155 A1 | 12/2006 | Patterson | 707/200 |
| 2007/0038600 A1 | 2/2007 | Guha | 707/3 |
| 2007/0078939 A1 | 4/2007 | Kallen | 709/207 |
| 2007/0094255 A1 | 4/2007 | Acharya et al. | 707/5 |
| 2007/0239694 A1* | 10/2007 | Singh et al. | 707/3 |
| 2008/0082481 A1* | 4/2008 | Joshi et al. | 707/2 |
| 2008/0195631 A1* | 8/2008 | Dom et al. | 707/10 |

OTHER PUBLICATIONS

Alexandros Ntoulas et al., "Detecting Spam Web Pages through Content Analysis" WWw, May 23-36, 2006, Edinburgh, Scottland. 10 pages.

Carlos Castillo et al., "Know Your Neighbors: Web Spam Detection Using the Web Topology", Nov. 23, 2006. 10 pages.

Zoltan Gyongyi et al., "Link Spam Detection Basedon Mass Estimation", VLDB'06, Sep. 12-15, 2006 Seoul, Korea, pp. 439-450.

Vijay Krishnan et al., "Web Spam Detection with Anti-Trust Rank" 6 pages. airweb.cse.lehigh.edu/2006/krishnan.pdf.

PCT/US2008/061692 International Search Report dated Oct. 14, 2008.

Jun Lai et al., "A Web Page Ranking Method by Analyzing Hyperlink Structure and K-Elements". In ICCSA 2006, May 8, 2006.

Dengyong Zhou et al., "Transductive Link Spam Detection". In AIRWeb 07, May 8, 2007.

Dengyong Zhou et al., "Spectral Clustering and Transductive Learning with Multiple Views". In ICML 08, Jun. 20, 2007.

P. Desikan and J. Srivastava. Hyperlink Analysis: Techniques and Applications. University of Minnesota, Department of Computer Science. pp. 1-39. Army High Performance Computing Center Technical . . . , 2002—Citeseerpages.

* cited by examiner

WEB PAGE ANALYSIS USING MULTIPLE GRAPHS

The present application is based on and claims the benefit of U.S. provisional patent application Ser. No. 60/927,648, filed May 4, 2007, the content of which is hereby incorporated by reference in its entirety.

BACKGROUND

There are a wide variety of different applications that can make use of a system that classifies different web pages in a web page collection. For instance, web pages can be classified according to subject matter. Spam detection applications can also be regarded as web page classification by classifying any given page as spam, or as a legitimate content page.

There are currently a number of different approaches to analyzing web pages in this way. A collection of web pages can be described by either hyperlinks between web pages or words occurring in web pages. In the former description, the collection of web pages can be represented as a directed graph, where each vertex (or node) in the graph represents a web page, and each directed edge in the graph represents a hyperlink between the web pages in the collection. In the latter description, each web page is represented as a vector in Euclidian space, and each element in the vector indicates the recurrence of some word; links can then, for example, encode the similarity between the corresponding documents, based on the two vectors.

To date, these two different types of web categorization have been viewed as separate systems. In fact, in the general machine learning problem setting, the data are often assumed to be represented in a single vector space or by a single graph. Yet, in many real life situations (such as in web page analysis) the same instances (the same web pages) may be represented in several different vector spaces, or by several different graphs, or even as a mixture of vector spaces and graphs.

One technology worth mentioning is referred to as multi-view learning. One approach to multiview learning is to define a kernel for each type of data representation, and then convexly combine those kernels. The underlying principle of this methodology is unclear, however. For instance, it is known that a spectral clustering approach for a single graph is derived from a real-value relaxation of combinatorial normalized cut, which naturally leads to graph Laplacians. However, it has not yet been considered which combinatorial cut can lead to the convex combination of graph Laplacians in a scenario in which multiple graphs are used.

The discussion above is merely provided for general background information and is not intended to be used as an aid in determining the scope of the claimed subject matter.

SUMMARY

A collection of web pages is regarded as a directed graph, in which the nodes of the graph are the web pages and directed edges are hyperlinks. Web pages are also represented by content, or by other features, to obtain a similarity graph over the web pages, where nodes again denote the web pages and the links or edges between each pair of nodes is weighted by a corresponding similarity between those two nodes. A random walk is defined for each graph, and a mixture of the random walks is obtained for the set of graphs. The collection of web pages is then analyzed based on the mixture to obtain a web page analysis result. The web page analysis result can be, for example, clustering of the web pages to discover web communities, classifying or categorizing the web pages, or spam detection indicating whether a given web page is spam or content.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
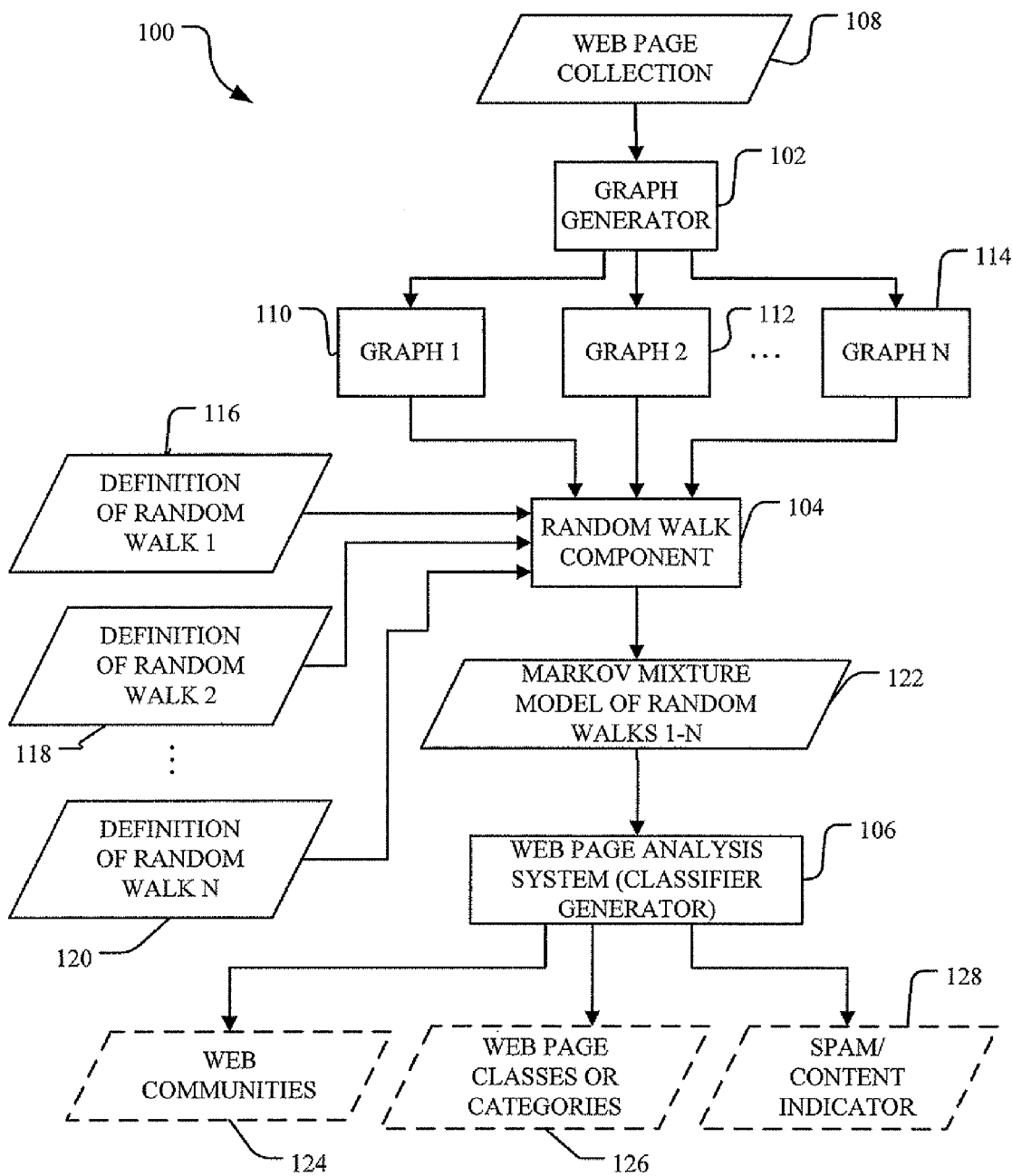
FIG. 1 is a block diagram for simultaneously learning relationships between multiple different views of data.
Figure 2:
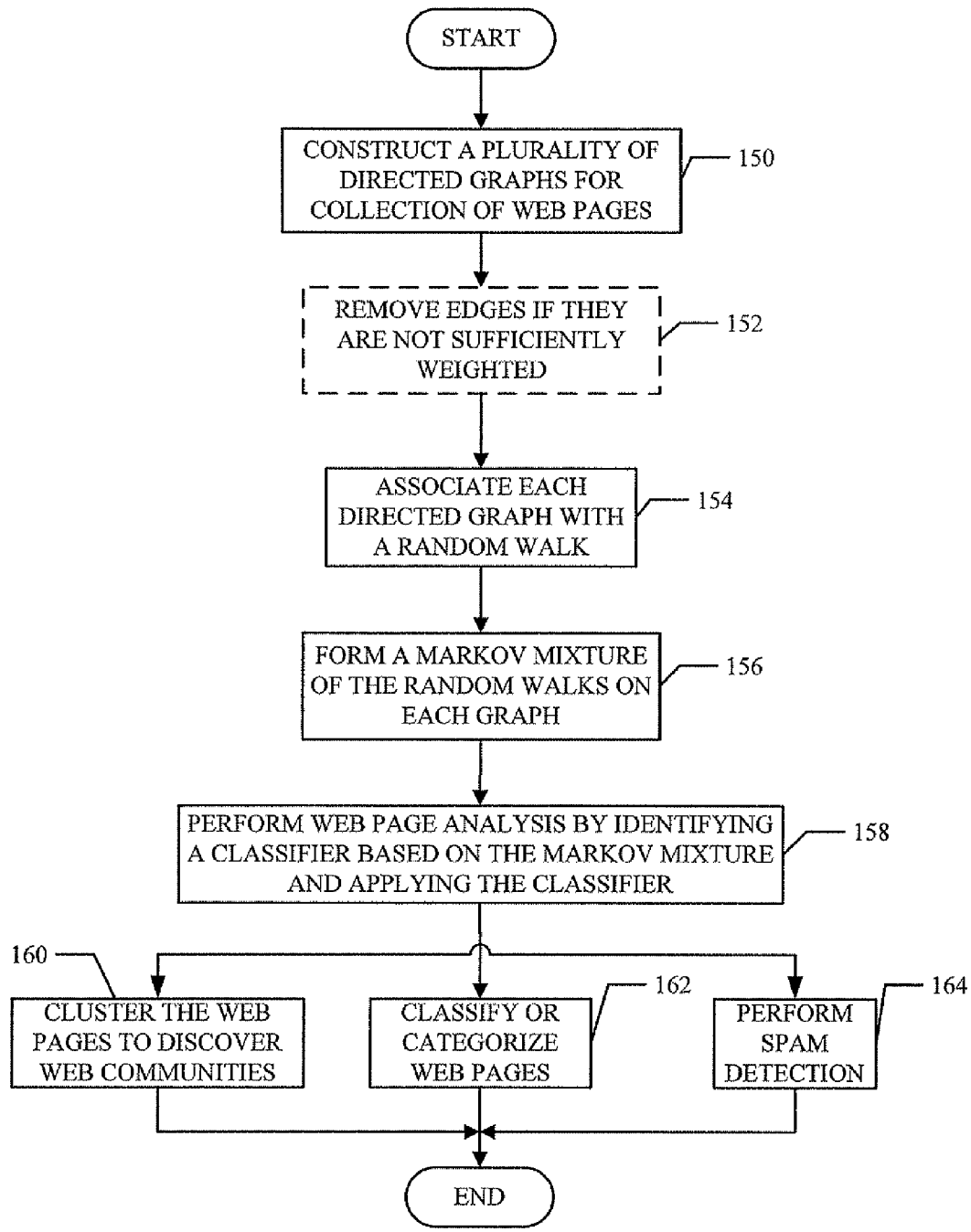
FIG. 2 is a flow diagram of the overall operation of the system shown in FIG. 1.

FIG. 1 is a block diagram of a system 100 that analyzes web pages based on a plurality of different representations of the web pages. System 100 includes graph generator 102, random walk component 104, and web page analysis system 106. System 100 also shows that graph generator 102 has access to a collection of web pages 108. FIG. 2 is a flow diagram illustrating the overall operation of the system shown in FIG. 1, and FIGS. 1 and 2 are now described in conjunction with one another.

Web page collection 108 can be the entire web, or a smaller subset of the pages on the web. In any case, web page collection 108 is illustratively regarded as a directed graph, where the nodes of the graph are the web pages and the directed pages are the hyperlinks. However, the collection of web pages 108 can also be represented in other ways, such as by the content of the web pages, or even by other features, such as word frequencies, for example. Therefore, graph generator 102 illustratively uses the web, and its hyperlinks, as a first graph (graph 1) shown in FIG. 1 as graph 110.

Graph generator 102 also, however, generates additional views (or graphical representations) of web page collection 108. In one embodiment, graph generator 102 computes pairwise similarities among the web pages in web page collection 108, based on a predetermined set of features. This calculation of pairwise similarities generates a similarity graph over the collection of web pages 108, where the nodes (or vertices) again denote the web pages, but the links between each pair of nodes is weighted by the corresponding similarity that has been computed. In one embodiment, such a similarity graph is labeled graph 2, and represented as graph 112 in FIG. 1.

For a different set of features, graph generator 102 generates yet another type of similarity graph 114. Any number N of graphs can be generated. Of course, a wide variety of different graphical representations of the collection of web pages 108 can be generated by graph generator 102. It is not important how this is done, or the specific graphical representations that are used. It is only important that a plurality of graphical representations of web page collection 108 are generated by graph generator 102.

In addition, links can be weighted in a wide variety of different ways. In one embodiment, for the sake of example only, a pair of linked web pages in the similarity graph have the link between them weighted by the similarity measure based on the dot product between text vectors of the two given web pages. Of course, other weighting techniques can be used as well.

Construction of a plurality of directed graphs for the collection of web pages 108 is illustrated by block 150 in FIG. 2.

Graph generator 102 may also, optionally, remove some of the edges in graph 112. This can be done, for example, if the similarity weight is smaller than a threshold value. In that case, the edge is simply removed. This is indicated by block 152 in FIG. 2, in phantom.

Once all of the graphs are generated, random walk component 104 associates a random walk with each graph 110-114. Basically, a random walk assumes that a user chooses a vertex (or node) in one of graphs 110-114 as a starting point. The user may then continues a random walk in the same graph 110-114, according to a certain probability, by selecting one of the edges in the current graph which leads to another node (or vertex), uniformly at random, or the user can jump to another graph 110-114, with another probability (if there are only two graphs, it is the remaining probability) and continue the random walk in that graph.

There are a variety of different random walks that the user can take, such as proceeding forward using outlinks from the current node, or proceeding backward, using inlinks to the current node, or proceeding in either direction, regardless of whether the link is an inlink or an outlink. In one embodiment, the random walks are specified using transition probabilities, by component 104, or they can be selected by a user, as well. Random walk definitions are shown at 116, 118 and 120 in FIG. 1, and associating each directed graph with a random walk is indicated by block 154 in FIG. 2.

Random walk component 104 then forms a Markov mixture 122 of the random walks on each graph 110-114. This mixture leads to a random walk which follows the outlinks (or another defined random walk) of the currently selected node (or current position) in the current graph 110-114, or jumps to another graph and then follows the outlinks (or another defined random walk) of the current position in that graph. Forming the Markov mixture of the random walks on each graph is indicated by block 156 in FIG. 2.

The Markov mixture of random walks yields stationary distributions for each node (or vertex) in each graph 110-114 which is indicative of the probability of residing at that node at any given time.

Markov mixture of the random walks can then be used to perform any desired web page analysis, using a web page analysis system 106. For instance, the Markov mixture can be used to identify web communities, to classify or categorize web pages, or to identify whether a given web page is spam, or a content page. It is currently known how to cluster nodes of a single directed graph. However, the present system, by considering the Markov mixture of random walks through all graphs, can cluster the nodes in a way that, overall, is good for all graphs, but may not be the best for any single graph 110-114.

Also, in one embodiment, the importance of each graph can be considered in the web page analysis. In other words, if for some clustering criterion, a certain graph is less important, then web page analysis system 116 can preferentially cluster the nodes (or vertices) in graphs 110-114 based on the mixture components from graphs which are more important to that criterion. This is discussed in greater detail below. Suffice it to say, however, that the nodes are clustered in a way that maximizes the probability of a random walk staying in a given cluster of nodes, and minimizes the probability of the random walk moving from one cluster to another.

For instance, clustering nodes of a graph can be viewed as cutting the links, joining different node clusters in the graph. Clustering the nodes into two clusters (for example) can thus be thought of as a "min cut" problem in which the particular links that are to be cust are identified by finding those links with a smallest total weight. Therefore, the graph is divided into clusters in such a way that cuts are not made between nodes that are linked by highly weighted links, but instead cuts are made between nodes that are linked by links having a relatively low weight. Clustering the nodes in the graphs to define web communities or web page classes or categories is indicated by blocks 124 and 126 in FIG. 1 and performing this analysis is indicated by blocks 158, 160 and 162 in FIG. 2.

The Markov mixture of the random walks can also be used, however, to perform spam detection. One embodiment of web page analysis system 106 employs an objective function for classification that forces the classification function to change as slowly as possible on densely connected subgraphs. In addition, the objective function receives training pages that are labeled as spam or content pages, and forces the function to fit (within a predetermined closeness) the given labels of those pages as well as possible. Then, each of the nodes in the graph are assigned a value by the classification function, and if the value falls on one side of a predetermined threshold, the pages can be considered spam, while if it fails to meet the threshold, the pages are considered content pages (or vice versa, depending on the classification function used). This is also discussed in greater detail below. Performing analysis to generate an indication of spam detection is indicated by block 128 in FIG. 1 and block 164 in FIG. 2.

It can thus be seen that the system is a principled way to combine substantially any similarity measure between domains (that is, any number of graphs), using a simple technique to analyze the vertices (such as web pages) associated with those graphs.

One embodiment of the system will now be defined more formally. First, one spectral clustering approach for directed graphs is discussed by way of example. This approach generalizes a current spectral undirected graph clustering scheme to that of directed graphs. It will be noted that an undirected graph is a special case of a directed graph in that an edge of an undirected graph connecting vertex u to vertex v represents two directed edges one from u to v and the other from v to u.

In this approach, a directed graph is regarded as a Markov chain. In other words, the spectral clustering for directed graphs is built on random walks over a directed graph rather than directly manipulating the combinatorial structures of the directed graph.

Prior to discussing the approach in more detail, it should be noted that there are a wide choice of random walks given a directed graph. Different random walk choices generally lead to different clustering results. Those random walks discussed herein are defined for the sake of example only, and are not the only ones that could be used, of course.

Given a directed graph G=(V,E,w), where V represents the vertices in the graph, E represents the edges in the graph and w represents weights for those edges, assume a random walk defined on G with transition probabilities p and stationary probability distribution $\pi$.

Let S denote an arbitrary subset of V, and $S^c$ the complement of S. Define the volumes:

$$volS = \sum_{v \in S} \pi(v), \text{ and} \qquad \text{Eq. 1}$$

$$vol\partial S = \sum_{u \in S, v \in S^c} \pi(u)p(u,v)$$

It can be verified that $volS+volS^c=1$, and $vol\partial S=vol\partial S^c$. Then clustering can be obtained by:

$$\underset{0 \neq S \subset V}{\operatorname{argmin}}\left\{c(S) = \frac{vol\partial S}{volSvolS^c}\right\} \qquad \text{Eq. 2}$$

The intuition behind this cut is as follows. Assume a random web surfer browses web pages by following hyperlinks and occasionally jumping to a randomly chosen web page. Then the web surfer will regard a set of hyperlinked web pages as a community if the probabilities of leaving the web page set is small while the probability of staying in the web page is large.

The combinatorial optimization problem in Eq. 2 can be approximately solved by relaxing it into a real-valued problem:

$$\underset{f \in R^{|V|}}{\operatorname{argmin}}\left\{\sum_{u \in V, v \in V} \pi(u)p(u,v)(f(u)-f(v))^2\right\} \text{ subject to} \qquad \text{Eq. 3}$$

$$\sum_{v \in V} f^2(v)\pi(v) = 1, \sum_{v \in V} f(v)\pi(v) = 0$$

Let P denote the transition probability matrix with its elements being $p(u,v)$, and $\Pi$ the diagonal matrix with its diagonal elements being stationary probabilities $\pi(u)$. Define a matrix:

$$L = \Pi - \frac{\Pi P + P^T \Pi}{2} \qquad \text{Eq. 4}$$

Then the clustering which satisfies the cut criterion can be approximately obtained by solving the generalized eigenvector system:

$$Lf = \lambda \Pi f \qquad \text{Eq. 5}$$

Where $\lambda$ is the second smallest eigenvalue.

The binary partition can be extended to a k-partition. Assume a k-partition to be $V=V_1 \cup V_2 \cup \ldots \cup V_k$, where $V_i \cap V_j = 0$ for all $1 \leq i,j \leq k$. Let $P_k$ denote a k-partition. Then a k-partition can be obtained by minimizing:

$$c(P_k) = \sum_{1 \leq i \leq k} \frac{vol\partial V_i}{volV_i} \qquad \text{Eq. 6}$$

Eq. 6 is the special case of Eq. 2 with k=2. Moreover, the solution of the corresponding relaxed optimization problem of Eq. 6 can be any orthonormal basis for the linear space spanned by the generalized eigenvectors of L pertaining to the k largest eigenvalues.

This type of spectral clustering can also be extended to multiple graphs. Consider two directed graphs $G_i=(V,E_i,w_i)$, i=1,2, which share the same set of vertices while having different edges and weights. Suppose S to be a nonempty subset of V. Define:

$$mvolS = \alpha vol_{G_1}S + (1-\alpha)vol_{G_2}S, \qquad \text{Eq. 7}$$

and $$mvol\partial S = \alpha vol_{G_1}\partial S + (1-\alpha)vol_{G_2}\partial S \qquad \text{Eq. 8}$$

where $\alpha$ is a parameter in [0,1]. Then, the vertex set V can be clustered into two subsets by:

$$\underset{0 \neq S \subset V}{\operatorname{argmin}}\left\{c(S) = \frac{mvol\partial S}{mvolSmvolS^c}\right\} \qquad \text{Eq. 9}$$

Clearly, the case of $\alpha=0$ or 1 reduces to the cut for a single graph.

Figure 3A:
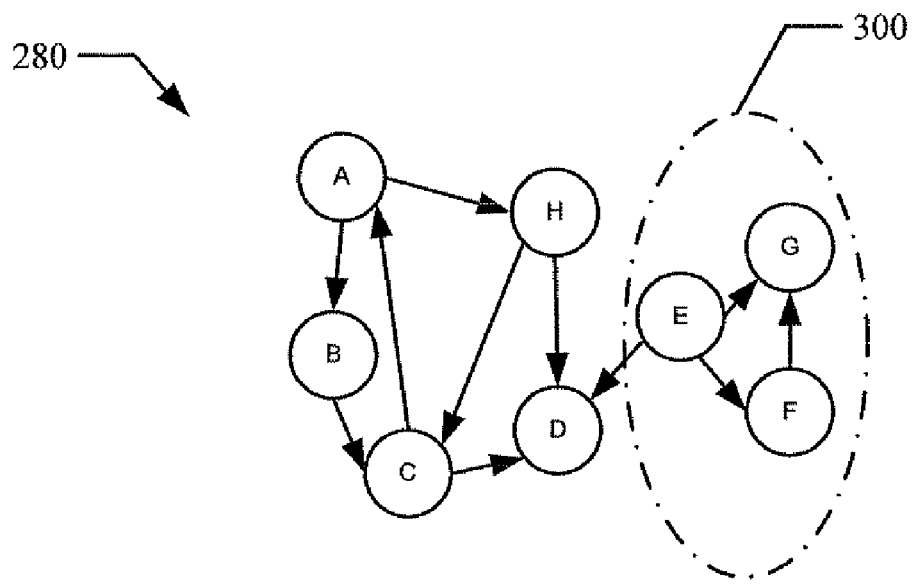
FIGS. 3A and 3B illustrate cluster vertices (or nodes) on two different directed graphs.
Figure 3B:
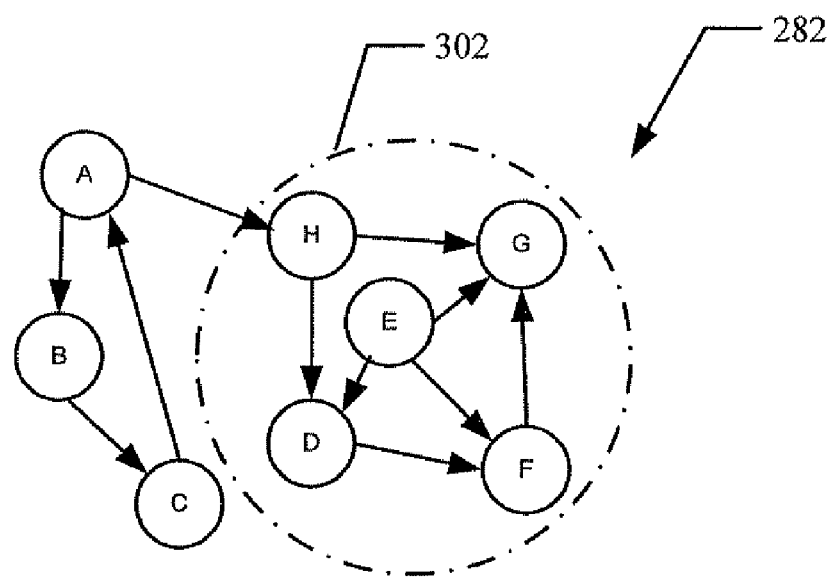

The basic motivation of defining such a multiple graph cut is that the goal is to obtain a cut which is good on average while it may not be the best for a single graph. FIGS. 3A and 3B show two different directed graphs 280 and 282 having the same vertices (nodes) labeled A-H and different edges. The dashed circles 300 and 302 show clusters that are optimum for the different graphs 280 and 282, respectively.

The parameter $\alpha$ can be used to specify the relative importance of each graph in clustering the vertices. The relative importance measure varies across different clustering goals. For example, if the goal is to cluster scientists into different groups such that in each group scientists have some research interests in common with each other, then the co-author relationship (which indicates scientists are co-author on publications) will dominate over other kinds of relationships. However, if the goal is to group the scientists in the same group that share the same political point of view, then the co-author relationship may not be helpful, and in fact, could be misleading.

An explanation will now be made of how random walk component 104 constructs a Markov mixture model 122 and the multiple graph cut in terms of random walk. Define functions:

$$\beta_1(u) = \frac{\alpha \pi_1(u)}{\alpha \pi_1(u) + (1-\alpha)\pi_2(u)}, \qquad \text{Eq. 10}$$

and $$\beta_2(u) = \frac{(1-\alpha)\pi_2(u)}{\alpha \pi_1(u) + (1-\alpha)\pi_2(u)} \qquad \text{Eq. 11}$$

It is clear that $\beta_1(u)+\beta_2(u)=1$. Then define new transition probabilities among vertices as:

$$p(u,v)=\beta_1(u)p_1(u,v)+\beta_2(u)p_2(u,v) \qquad \text{Eq. 12}$$

Note that $\beta_1$ and $\beta_2$ vary from vertex to vertex rather than being a constant. Therefore, the above formula does not mean a linear combination of the transition probability matrices for each graph.

The stationary distribution of the Markov mixture model is:

$$\pi(v)=\alpha\pi_1(v)+(1-\alpha)\pi_2(v) \qquad \text{Eq. 13}$$

consequently, $$mvolS = \alpha \sum_{v \in S} \pi_1(v) + (1-\alpha) \sum_{v \in S} \pi_2(v) = \sum_{v \in S} \pi(v) = P(S) \quad \text{Eq. 14}$$

Similarly, $mvolS^c = P(S^c)$. Moreover, $$mvolS = \alpha \sum_{(u,v) \in \partial_1 S} \pi_1(u) p_1(u,v) + \quad \text{Eq. 15}$$
$$(1-\alpha) \sum_{(u,v) \in \partial_2 S} \pi_2(u) p_2(u,v) =$$
$$\sum_{u \in S, v \in S^c} (\alpha \pi_1(u) + (1-\alpha)\pi_2(u)).$$

$$\left( \frac{\alpha \pi_1(u)}{\alpha \pi_1(u) + (1-\alpha)\pi_2(u)} p_1(u,v) + \quad \text{Eq. 16} \right.$$
$$\left. \frac{(1-\alpha)\pi_2(u)}{\alpha \pi_1(u) + (1-\alpha)\pi_2(u)} p_2(u,v) \right)$$

$$= \sum_{u \in S, v \in S^c} \pi(u) p(u,v) \quad \text{Eq. 17}$$

$$= P(S \to S^c) \quad \text{Eq. 18}$$

Similarly, $mvol\partial S^c = P(S^c \to S)$. It can be verified that:

$$P(S^c \to S) = P(S \to S^c) \quad \text{Eq. 19}$$

Thus, $mvol\partial S^c = mvol\partial S$. Hence $$c(S) = \frac{mvol\partial S(mvolS + mvolS^c)}{mvolS \, mvolS^c} \quad \text{Eq. 20}$$

$$= \frac{mvol\partial S}{mvolS} + \frac{mvol\partial S^c}{mvolS^c} \quad \text{Eq. 21}$$

$$= P(S \to S^c \mid S) + P(S^c \to S \mid S^c) \quad \text{Eq. 22}$$

Figure 4A:
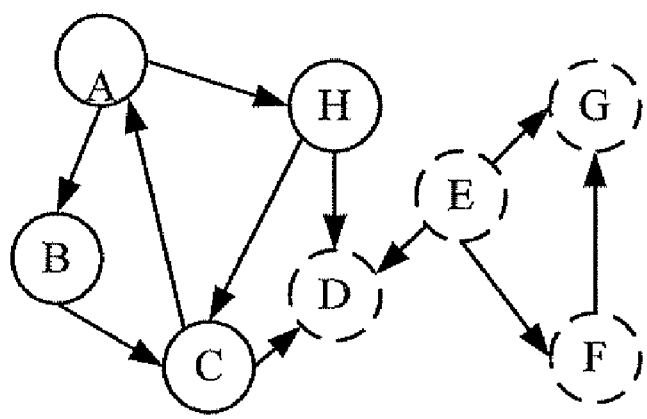
FIGS. 4A and 4B illustrate two different directed graphs having nodes (or vertices) classified into two different classes.
Figure 4B:
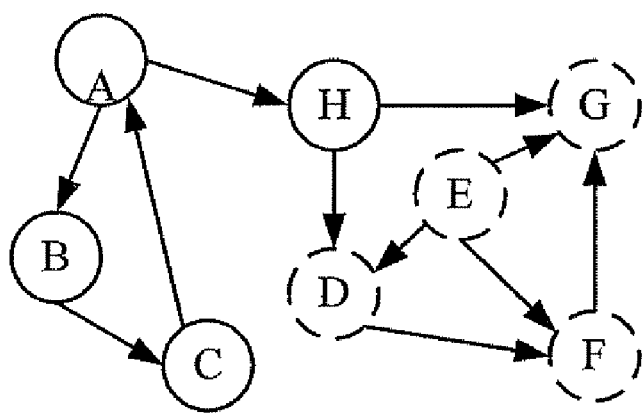

Now the multiple graph cut can be understood as follows. Assume a random walk with the current position being at a given vertex in one graph. Then, in the next step, the walker may continue his random walk in the same graph with a certain probability, or jump to the other graph with the remaining probability and continue his random walk. A subset of vertices is regarded as a cluster if during the random walk the probability of leaving this subset is small while the probability of staying in the same subset is large. Of course, the above analysis can be extended to more than two graphs. The multiple graph spectral clustering is summarized in the pseudo code in Table 1, and FIGS. 4A and 4B shows clustered nodes after the application of the spectral clustering.

TABLE 1

SPECTRAL CLUSTERING WITH MULTIPLE GRAPHS

Given k graphs $G_i = (V, E_i, w_i)$, $1 \leq i \leq k$, which are directed or undirected, and share the same vertex set V, the vertices in V can be clustered into two subsets as follows:
1. For each graph $G_i$, associate it with a random walk which has a unique stationary distribution. Denote by $p_i$ the transition probabilities, and $\pi_i$ the stationary distribution satisfying:

$$\sum_{u \in V} \pi_i(u) p_i(u,v) = \pi_i(v).$$

TABLE 1-continued

SPECTRAL CLUSTERING WITH MULTIPLE GRAPHS

2. Define a mixture of those random walks by $$p(u,v) = \sum_{i \leq k} \beta_i(u) p_i(u,v),$$

where $$\beta_i(u) = \frac{\alpha_i \pi_i(u)}{\sum_{j \leq k} \alpha_j \pi_j(u)}, \text{ and } \sum_{j \leq k} \alpha_j = 1, \alpha_j \geq 0.$$

The random walk mixture has a unique stationary distribution given by $$\pi(v) = \sum_{i \leq k} \alpha_i \pi_i(v).$$

3. Denote by P the matrix with the elements $p(u,v)$, and $\Pi$ the diagonal matrix with the diagonal elements $\pi(u)$. Form the matrix $$L = \Pi - \frac{\Pi P + P^T \Pi}{2}.$$

4. Compute the generalized eigenvector satisfying
$Lf = \lambda \Pi f$
where $\lambda$ is the second smallest eigenvalue, and cluster the vertex set V into two parts
$S = \{v \in V | f(v) \geq 0\}$ and $S^c = \{v \in V | f(v) < 0\}$.

The special case of two undirected graphs is now discussed. Assume two undirected graphs $G_i = (V, E_i, w_i)$, $i=1,2$. Given a vertex $v \in V$, denote by $$d_i(v) = \sum_u w_i(u,v).$$

With respect to each graph $G_i$, define the boundary of S as $\partial_i S = \{(u,v) \in E_i | u \in S, v \in S^c\}$, and the volume of S as $$vol_i S = \sum_{u \in S, v \in S} w_i(u,v) = \sum_{v \in S} d_i(v),$$

and the volume of $\partial S$ as $$vol_i \partial_i S = \sum_{(u,v) \in \partial_i S} w_i(u,v).$$

The multiview boundary of S with respect to both $G_1$ and $G_2$ is defined by $\partial S = \partial_1 S \cup \partial_2 S$, and the multiview volume of S is defined as:

$$mvolS = \alpha \frac{vol_1 S}{vol_1 V} + (1-\alpha) \frac{vol_2 S}{vol_2 V}, \quad \text{Eq. 23}$$

and the multiview volume of ∂S is:

$$mvol\partial S = \alpha \frac{vol_1 \partial_1 S}{vol_1 V} + (1-\alpha)\frac{vol_2 \partial_2 S}{vol_2 V} \qquad \text{Eq. 24}$$

Then mvolS+mvolS$^c$=1. The volume based normalization in the above definitions can be noted. The normalization may be desirable because the weights on different graphs can be measured in very different scales. For instance, in web categorization, one can form at least two graphs. One is the directed graph from the web hyperlink structure, and another is a fully connected undirected graph weighted by the textual kernel of the web pages. The normalization leads to the Markov mixture model.

The natural random walk on undirected graphs is now considered. The transition probabilities are $p_i(u,v)=w_i(u,v)/d_i(u)$, and the stationary probabilities $\pi_i(u)=d_i(u)/vol_i V$. Then:

$$\beta_1(u) = \frac{\alpha d_1(u)/vol_1 V}{\alpha d_1(u)/vol_1 V + (1-\alpha)d_2(u)/vol_2 V}, \qquad \text{Eq. 25}$$

and $$\beta_2(u) = \frac{(1-\alpha)d_2(u)/vol_1 V}{\alpha d_1(u)/vol_1 V + (1-\alpha)d_2(u)/vol_2 V}. \qquad \text{Eq. 26}$$

Thus:

$$\begin{aligned}p(u,v) &= \beta_1(u)p_1(u,v) + \beta_2(u)p_2(u,v) \\ &= \frac{\alpha w_1(u,v)/vol_1 V}{\alpha d_1(u)/vol_1 V + (1-\alpha)d_2(u)/vol_2 V} + \\ &\quad \frac{(1-\alpha)w_2(u,v)/vol_1 V}{\alpha d_1(u)/vol_1 V + (1-\alpha)d_2(u)/vol_2 V}\end{aligned} \qquad \text{Eq. 27}$$

and $\pi(u) = \alpha d_1(u)/vol_1 V + (1-\alpha)d_2(u)/vol_2 V$.

Now introduce $w(u,v)=\alpha w_1(u,v)/vol_1 V + (1-\alpha)w_2(u,v)/vol_2 V$, and $d(u)=\pi(u)$, then $p(u,v)=w(u,v)/d(u)$. This means that, in the special case of multiple undirected graphs, the Markov mixture model reduces to a linear combination of adjacency matrices or a convex combination of normalized adjacency matrices. Hence, it is different from the other known approaches which convexly combine undirected graph Laplacians via $L=\alpha L_1+(1-\alpha)L_2$ without any stated reasons. In those approaches, the Laplacian matrix for undirected graphs is defined to be $L_i=D_i-W_i$, where $D_i$ is a diagonal matrix with its diagonal elements being $d_i(u)$, and $W_i$ is the weight matrix with each element being $w_i(u,v)$.

Classification of web pages in collection 108 is now discussed. A transductive inference algorithm can be built from a clustering approach. First consider classification on a single graph. Assume a directed graph G=(V,E,w), and a discrete label set L={−1,1}. The vertices in a subset S⊂V have been classified as 1 or −1. The present task, then, is to predict the labels of the remaining unclassified vertices.

Let $f:V \rightarrow S$ denote the classification function. Define a function y with y(v)=1 or −1 if v∈S, and 0 if v is unlabeled. Then, a classification function can be chosen via:

$$\operatorname*{argmin}_{f \in R^{|V|}}\left\{\sum_{u \in V, v \in V} \pi(u)p(u,v)(f(u)-f(v))^2 + C\sum_{v \in V} \pi(v)(f(v)-y(v))^2\right\} \qquad \text{Eq. 28}$$

Where C>0 is a parameter. Note that the first term in the optimization problem is the objective function for clustering in Eq. 3. Hence, intuitively, the objective function for classification forces the classification function to change as slowly as possible on densely connected subgraphs. Moreover, the second term in the objective function forces the classification function to fit the given labels as well as possible.

A tradeoff between these two requirements is measured by the parameter C.

If each function is scaled by a factor $\upsilon^{-1/2}$, then Eq. 28 will be transformed into:

$$\operatorname*{argmin}_{f \in R^{|V|}}\left\{\sum_{u \in V, v \in V} \pi(u)p(u,v)\left(\frac{f(u)}{\sqrt{\pi(u)}} - \frac{f(v)}{\sqrt{\pi(v)}}\right)^2 + C\sum_{v \in V}(f(v)-y(v))^2\right\}. \qquad \text{Eq. 29}$$

However, Eq. 28 appears to be much more natural than Eq. 29.

For solving the optimization problem in Eq. 28, differentiate the objective function with respect to φ and then obtain:

$$Lf + C\Pi(f-y) = 0, \qquad \text{Eq. 30}$$

The above equation can be written as:

$$(C\Pi+L)f = C\Pi y, \qquad \text{Eq. 31}$$

This linear system has the closed form solution:

$$f = C(C\Pi+L)^{-1}\Pi y. \qquad \text{Eq. 32}$$

However, the linear system can be solved without computing the inverse. The linear system is symmetric and positive definite. Those properties can be exploited in a fast implementation.

Classification with multiple graphs can be formalized as follows: Given a set of graphs $G_i=(V,E_i,w_i), 1 \leq i \leq k$, with a vertex set V in common, the vertices in subset S⊂V have been labeled as 1 or −1, the goal is to predict the labels of the remaining unlabeled vertices in $S^c$. To extend the single graph based transduction to multiple graphs, the only thing that must be done is to construct the Markov mixture model used in the multiview spectral clustering as discussed above with respect to Table 1. For completeness, the multiview transduction is summarized in the pseudocode in Table 2. It should be noted that the algorithm uses a parameter α∈[0,1] instead of C∈]0,∞[. The relationship between them is α=1/(1+C).

TABLE 2

CLASSIFICATION WITH MULTIPLE GRAPHS

Given k graphs $G_i = (V, E_i, w_i), 1 \leq i \leq k$, which are directed or undirected, and share the same vertex set V, the vertices in a subset S ⊂ V have been labeled as 1 or −1, the remaining unlabeled vertices can be classified as follows:
1. For each graph $G_i$ associate it with a random walk which has a unique stationary distribution. Denote by $p_i$ the transition probabilities, and $\pi_i$ the stationary distribution.
2. Define a mixture of those random walks by:

$$p(u,v) = \sum_{i \leq k} \beta_i(u)p_i(u,v),$$

TABLE 2-continued

CLASSIFICATION WITH MULTIPLE GRAPHS where $$\beta_i(u) = \frac{\alpha_i \pi_i(u)}{\sum_{j \leq k} \alpha_j \pi_j(u)}, \text{ and } \sum_{j \leq k} \alpha_j = 1, \alpha_j \geq 0.$$

The random walk mixture has a unique stationary distribution given by:

$$\pi(v) = \sum_{i \leq k} \alpha_i \pi_i(v)$$

3. Denote by P the matrix with the elements p(u, v), and Π the diagonal matrix with the diagonal elements π(u). Form the matrix:

$$M = \Pi - \alpha \frac{\Pi P + P^T \Pi}{2}$$

where α is a parameter in [0, 1].
4. Define a function y on v with y(v) = 1 or −1 if vertex v is labeled, and 0 if v is unlabeled.
Solve the linear system:
   Mf = Πy,
and classify each unlabeled vertex v as sign f(v).

Figure 5:
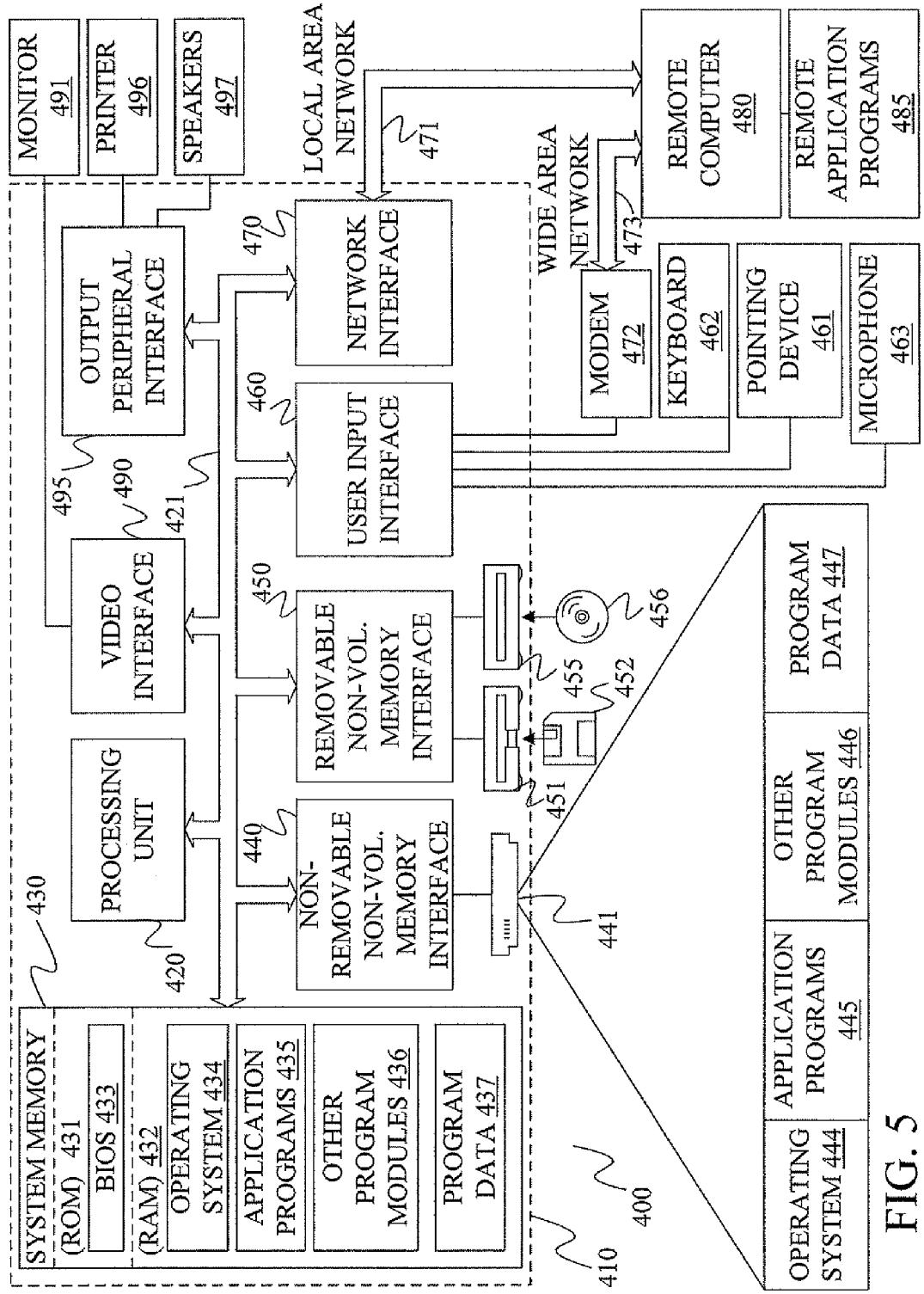
FIG. 5 is a block diagram of one illustrative computing environment.

FIG. 5 illustrates an example of a suitable computing system environment 400 on which embodiments may be implemented. The computing system environment 400 is only one example of a suitable computing environment and is not intended to suggest any limitation as to the scope of use or functionality of the claimed subject matter. Neither should the computing environment 400 be interpreted as having any dependency or requirement relating to any one or combination of components illustrated in the exemplary operating environment 400.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 5, an exemplary system for implementing some embodiments includes a general-purpose computing device in the form of a computer 410. Components of computer 110 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 5 illustrates operating system 434, application programs 435, other program modules 436, and program data 437. System 100 can be implemented in modules 436 or elsewhere, as desired.

The computer 410 may also include other removable/non-removable volatile/nonvolatile computer storage media. By way of example only, FIG. 5 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 5, provide storage of computer readable instructions, data structures, program modules and other data for the computer 410. In FIG. 5, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies.

A user may enter commands and information into the computer 410 through input devices such as a keyboard 462, a microphone 463, and a pointing device 461, such as a mouse, trackball or touch pad. Other input devices (not shown) may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 is operated in a networked environment using logical connections to one or more remote computers, such as a remote computer 480. The remote computer 480 may be a personal computer, a hand-held device, a server, a router, a network PC, a peer device or other common network node, and typically includes many or all of the elements described above relative to the computer 410. The logical connections depicted in FIG. 5 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 5 illustrates remote application programs 485 as residing on remote computer 480. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of analyzing web pages, comprising:
   accessing a plurality of web pages;
   generating a plurality of different graphical representations of the web pages, each graphical representation having nodes that represent the web pages and links between the nodes, the nodes in each of the graphical representations representing a same set of the web pages as represented in other of the graphical representations, and the links in each graphical representation representing different relationships between the nodes in each graphical representation from the other graphical representations;
   generating a model that models a random walk through all of the different graphical representations;
   receiving training pages, wherein each of a plurality of training nodes, in the graphical representations, corresponding to a training page has a target function value indicative of a label for the corresponding training page, the label indicating the corresponding training page belongs to one of a plurality of different groups;
   generating a classifier based on the model, based on classifier function values of nodes in the graphical representations, and based on the target function values of the training pages; and
   grouping the web pages into groups with the classifier.

2. The method of claim 1 wherein generating a classifier comprises:
   selecting a classifier function by optimizing a cost function that penalizes differences between the target function value and a classifier function value for the training nodes.

3. The method of claim 2 wherein generating a classifier comprises:
   selecting the classifier function by optimizing the cost function, wherein the cost function also penalizes differences between classifier function values calculated for different nodes in the graphical representations.

4. The method of claim 1 wherein generating a plurality of graphical representations comprises:
   generating a first graphical representation having the links between the nodes being representative of hyperlinks between the web pages.

5. The method of claim 4 wherein generating a plurality of graphical representations comprises:
   generating a second graphical representation having the links between the nodes being representative of a similarity of the web pages.

6. The method of claim 5 wherein each of the links in the second graphical representation are weighted by a weight indicating similarity between two web pages connected by the links.

7. The method of claim 5 wherein generating a model comprises:
   individually selecting a random walk definition defining a random walk for each of the graphical representations.

8. The method of claim 7 wherein generating a model further comprises:
   generating the model to collectively model the random walks defined for each of the graphical representations.

9. The method of claim 8 wherein generating a model comprises:
   generating a Markov mixture of the random walks defined for each of the graphical representations.

10. The method of claim 1 wherein grouping the web pages into groups comprises:

grouping the web pages into a first group indicative of a spam web page and a second group indicative of a content web page.

11. The method of claim 1 wherein grouping the web pages into groups comprises:
grouping the web pages into groups based on similarity of content.

12. The method of claim 1 wherein grouping the web pages into groups comprises:
identifying a community of web pages based on usage of the web pages.

13. A system for analyzing a collection of web pages, comprising:
a graph generator generating a plurality of different graphs, each of the different graphs representing the same plurality of web pages, each graph having a plurality of nodes and links linking the nodes, each node representing a web page in the collection and each link representing a relationship between web pages linked by the link;
a random walk component generating a mixture model modeling a collection of random walks performed on the plurality of different graphs;
a web page analysis component selecting an analysis function based on the mixture model, based on how closely analysis function values for the nodes conform to known values, and based on how much the analysis function values for the nodes change over the different graphs, the web page analysis component grouping the web pages into groups based on the selected analysis function; and
a computer processing unit being a functional component of the system and being activated by the graph generator, the random walk component and the web page analysis component, to facilitate generating the plurality of graphs, generating the mixture model, selecting an analysis function and grouping the web pages.

14. The system of claim 13 wherein the web page analysis component groups the web pages into groups that are likely to be viewed as groups in each graph, given the random walk associated with each graph.

15. The system of claim 14 wherein the web page analysis component groups the web pages into groups that are likely to be viewed as a group given all graphs, and all random walks defined for the graphs.

16. The system of claim 13 wherein the random walk component generates the mixture by following a random walk defined for each graph.

17. The system of claim 16 wherein the random walk component generates the mixture model by assigning stationary probabilities to the nodes in each graph.

18. The system of claim 17 wherein the random walk component generates the mixture model as a Markov mixture of each of the random walks.

19. A method, implemented on a computer, of identifying groups of nodes in a collection of a set of web pages, comprising:
generating a plurality of different directed graphs, each directed graph having, as its nodes, the set of web pages linked by directed edges, each directed graph having edges that represent a different relationship between nodes connected by the edges than edges in other directed graphs;
defining a random walk for each of the different directed graphs, by defining transition probabilities for each pair of nodes;
performing the random walks to generate stationary probabilities indicative of a probability of being on a given node by selecting a starting node in a starting directed graph and repeatedly selecting uniformly, at random, whether to follow an edge from the starting node to another node in the starting directed graph, or to a node in another directed graph or to jump, without following a link, to another node in any of the different directed graphs;
identifying a classifier function based on the stationary probabilities and based on classifier function values for nodes satisfying a cost function that simultaneously considers differences between classifier function values for nodes and training data and differences among classifier function values for the nodes; and
storing the groups for use in a web page analysis system.

20. The method of claim 19 wherein performing the random walks comprises:
generating a mixture model modeling a mixture of the stationary probabilities on each of the different directed graphs.

* * * * *